United States Patent [19]

Plaut

[11] Patent Number: 4,585,118

[45] Date of Patent: Apr. 29, 1986

[54] SELF-TRACKING BELT ROLLER

[76] Inventor: Werner P. B. Plaut, 350B Heritage Hills, Somers, N.Y. 10589

[21] Appl. No.: 579,307

[22] Filed: Feb. 13, 1984

[51] Int. Cl.[4] .............................................. B65G 39/04
[52] U.S. Cl. .................................. 198/840; 198/626; 198/605; 198/607; 198/843
[58] Field of Search .............. 198/840, 626, 604, 605, 198/607, 842, 843, 818, 821; 474/187, 189

[56] References Cited

U.S. PATENT DOCUMENTS

| 499,472 | 6/1893 | Robins, Jr. ........................ 198/818 X |
| 1,275,670 | 8/1918 | Fry et al. ........................ 474/187 X |
| 3,219,176 | 11/1965 | Kindig ........................ 198/843 |
| 3,773,167 | 11/1973 | McGinnis ........................ 198/818 X |
| 3,982,626 | 9/1976 | Mehta ........................ 198/626 |
| 4,195,724 | 4/1980 | Jamitsch ........................ 198/626 |

FOREIGN PATENT DOCUMENTS

| 2717100 | 10/1978 | Fed. Rep. of Germany ...... 198/607 |
| 2144488 | 2/1979 | Fed. Rep. of Germany ...... 198/842 |
| 1123345 | 9/1956 | France ........................ 198/626 |
| 100073 | 8/1979 | Japan ........................ 198/604 |
| 35870 | 8/1954 | Poland ........................ 198/626 |
| 1162115 | 8/1969 | United Kingdom ........................ 198/842 |

Primary Examiner—Joseph E. Valenza
Assistant Examiner—Michael Stone
Attorney, Agent, or Firm—Fishman & Dionne

[57] ABSTRACT

A self-tracking roller comprised of a plurality of individual elements is presented. These elements alternate between evenly distributed idler rings and spacer rings arranged in two groups having a central space therebetween. This central space permits two superimposed dual belts to form a sandwich for conveying solid material therein. Each idler or tracking ring has a conical shaped configuration which acts to urge a conveyor belt thereon toward the center of the roller. The relative dimensions and number of rings may be flexibly varied depending on the application. The result is a self-tracking roller aptly suited for use in conjunction with dual or sandwich conveyor belt systems.

24 Claims, 4 Drawing Figures

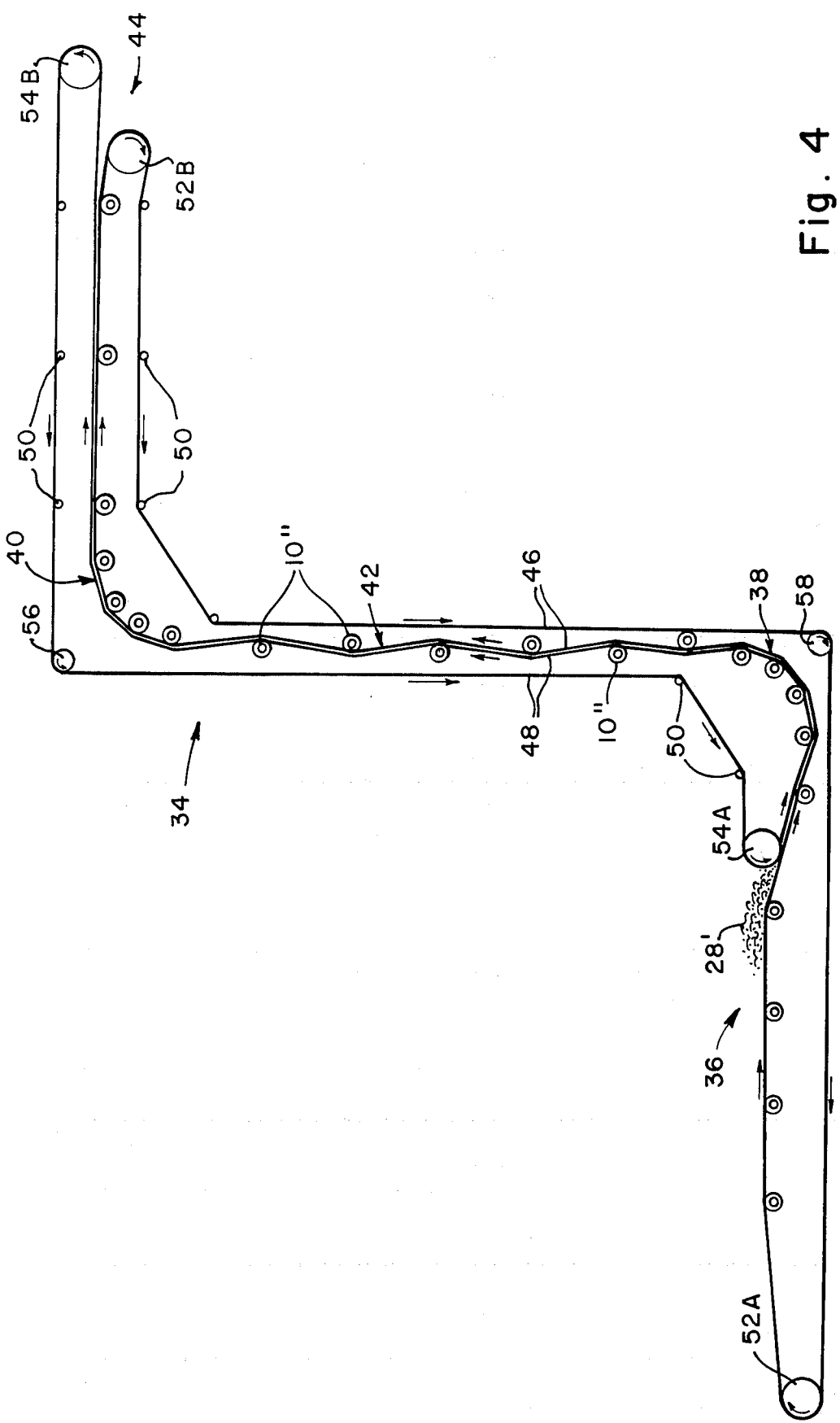

SELF-TRACKING BELT ROLLER

BACKGROUND OF THE INVENTION

The present invention relates to the field of self-tracking rollers or idlers for use in conjunction with dual or sandwich belt endless conveyor systems. More particularly, this invention relates to a new and improved self-tracking impact absorbing sandwich belt roller comprised of two groups of alternating idler rings and spacer rings having a variable sized space therebetween.

Dual endless conveyor belts, commonly termed sandwich belts, are well known to those skilled in the art. These dual belt systems typically comprise two endless conveyor belts which are urged into a sandwich-like contact therebetween and have been found aptly suited for transporting sludge, filter cake, solid or semi-solid bulk material, sewage and other slurry type materials. Prior art dual belt systems of this type are disclosed in U.S. Pat. No. 3,910,405.

Unfortunately, sandwich conveyor belt systems suffer from assorted tracking and guidance problems which may cause detrimental effects, the most important being product spillage with subsequent cots of clean-up, downtime for repair and potential damage to the belts themselves. Numerous attempts have been made to improve belt tracking for dual endless conveyor belts, such as, for example, the mutually interlocking belt system described in U.S. Pat. No. 2,836,285. These interlocking belts, however, are difficult and often prohibitively expensive to manufacture.

Other attempts at improving the tracking of dual or sandwich belts have included complex and complicated guidance systems. But, as with the interlocking belts, the guidance systems are very expensive to manufacture and install and are often of questionable efficiency. Consequently, the complicated nature and high cost of these guidance systems pose serious drawbacks and deficiencies.

Many of the tracking problems of dual conveyor belts are a result of the particular rollers currently in use. These rollers typically utilize either flat or impact ring-type rollers. Solid idler-type rollers comprised of a suitable metal material are also commonly found. Unfortunately, both types of idlers necessitate the undesirable and complicated guidance systems discussed above.

A number of rollers for use in conjunction with single belt conveyor systems and having a degree of automatic centering or self-tracking capability have been disclosed in, for example, U.S. Pat. Nos. 2,592,581, 2,772,879, 3,029,655, 3,219,176 and 3,248,775. While these self-centering rollers are suitable for certain single belt conveyor applications, the rollers described in the referenced patents are not suited for use in dual or sandwich belt systems wherein sludge or similar material is to be elevated and/or conveyed.

It would be advantageous therefore to provide a low-cost self-tracking roller for use in conjunction with sandwich type conveyor belt systems so that problems relating to tracking and centering may be efficiently reduced or overcome.

SUMMARY OF THE INVENTION

The above discussed and other problems of the prior art are overcome or alleviated by the self-tracking roller and dual belt conveyor system of the present invention. In accordance with the present invention, a self-tracking roller is comprised of a plurality of individual elements. These elements alternate between evenly distributed idler rings and spacer rings arranged in two groups having a central space therebetween. This space permits two superimposed dual belts to form a sandwich for conveying solid material therein. Each idler ring has a conical shaped configuration which acts to urge a conveyor belt thereon toward the center of the roller. This automatic centering function is achieved by positioning the nose of the conically shaped idler element outwardly, away from the center of the roller. The result is a novel self-tracking roller which is aptly suited for use in conjunction with dual conveyor belt systems.

The novel roller configuration of the present invention results in two opposing and balanced centering forces. These forces permit the dual belts to form the required pockets which hold the material therebetween. As a result, the pressure of the belts on the material is relieved, thereby making it possible to carry much softer (less solid) substances than other prior art systems. In fact, one prior art manufacturer who utilized solid rubber rollers claims that their roller is not suitable for carrying sludges of less than 45% solid content. In distinct contrast, the roller of the present invention, in combination with dual belts, has conveyed materials having as little as 12% solids therein.

The dual conveyor belt roller of the present invention provides many additional improvements and features over the prior art. For example, improved flexibility and versatility in design and materials handling capability may be achieved simply by varying the size of the central space and/or adding additional spacer rings between idler rings.

Another important feature of the present invention is the self-tracking ability provided by the positioning of the conical shaped idler rings. Note that the flexibility of construction discussed above will assist in the self-tracking feature by permitting particular rollers to be tailored to the conveyor belt dimensions and other variables.

Finally, other improvements include ease of manufacture and assembly thereby resulting in a relatively low cost roller. This low cost is characterized by the ability of the individual rings to be machined by conventional tools rather than more expensive one-piece molding as found in the prior art.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered alike in the several FIGURES:

FIG. 4 is a schematic view of a dual conveyor belt system having the roller of FIG. 1 incorporated therein in accordance with the present invention.

DESCRIPTION OF THE PREFERRED EMBODIMENT

Figure 1:
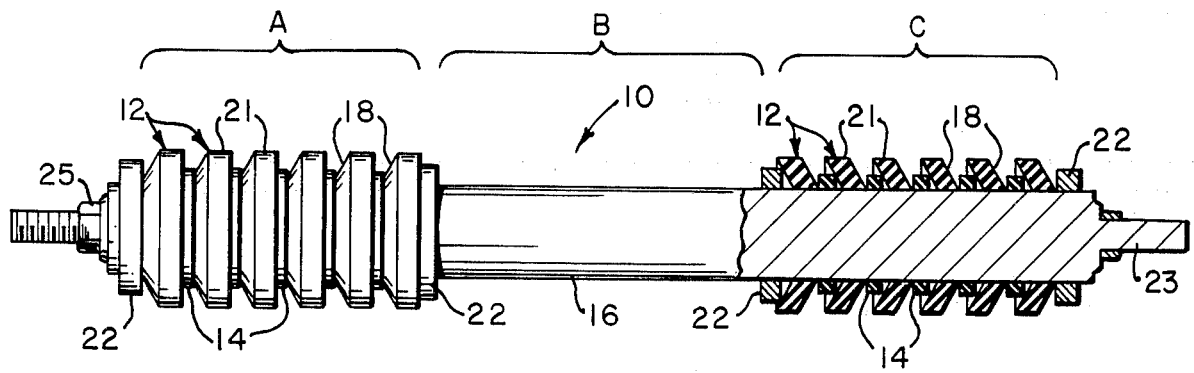
FIG. 1 is a front elevation view, partially in cross section, of the conveyor belt roller of the present invention.

Referring first to FIG. 1, a roller in accordance with the present invention is shown generally at 10. The roller 10 has three distinct portions or sections corresponding to A, B and C in FIG. 1. Sections A and C are comprised of a plurality of individual elements or rings. These elements are of two types which alternate therebetween. These two types include idler or tracking rings 12 and spacer rings 14, all of which are slidably mounted onto a roller shaft 16 via a central opening therethrough. It will be understood that portion B of roller 10 is simply a space (i.e., there are no idler or spacer rings 12 and 14 on shaft 16).

Figure 2:
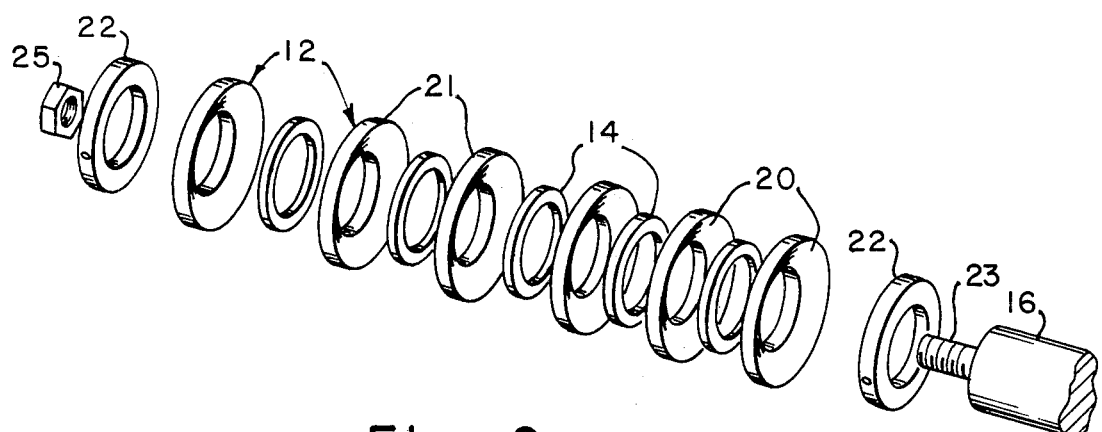
FIG. 2 is a perspective exploded view of a portion of FIG. 1.

Idler or tracking rings 12 have a conical shape on both the exterior 18 and interior 20 surfaces thereof (see FIG. 2). A flat cylindrical portion 21 is positioned between the conical exterior 18 and interior 20 surfaces. Interposed between idler rings 12 are spacer rings 14. Spacer rings 14 are simply cylindrical segments which may be urged into abutting contact with the interior surface 20 and the exterior surface 18 of adjacent idler rings 12. Rings 12 and 14 are mounted onto shaft 16 in an alternating fashion between two sets of collars 22. It will be understood that depending upon the particular application, the number of spacer rings 14 inserted between idler rings 12 may be varied accordingly, thereby imparting enormous flexibility in design.

It should also be understood that the spatial positioning of each idler ring 12 on the shaft 16 is very important in regard to the desirable self-centering or self-tracking feature of the present invention. Thus, as shown in FIG. 1, the idler rings are positioned such that the conical nose end of each ring 12 points outwardly away from the center portion B of roller 10. This positioning will act to urge a conveyor belt toward the center B of the roller 10 thereby maintaining desirable self-tracking. As a direct consequence thereof, expensive and complicated guidance or tracking systems and tracking alarms are no longer necessary.

The self-tracking roller 10 of the present invention is extremely economical and easy to manufacture. In a preferred method of manufacturing, rollers are simply cut to size and machined accordingly from long continuous rubber tubes. This is very cost efficient as well as imparting enormous design flexibility compared to the prior art methods of molding one-piece spacer-idler ring assemblies as described in, for example, U.S. Pat. No. 3,744,329.

It will be appreciated that the shaft 16 is combined with any suitable and conventional bearing system in order to effect the required free-spinning roller action. Accordingly, in FIGS. 1 and 2, shaft 16 has bearing shaft 23 and nut 25 mounted on either end. Bearing shaft 23 has associated therewith ball bearings or the like which permit rotational movement relative to shaft 16.

Figure 3:
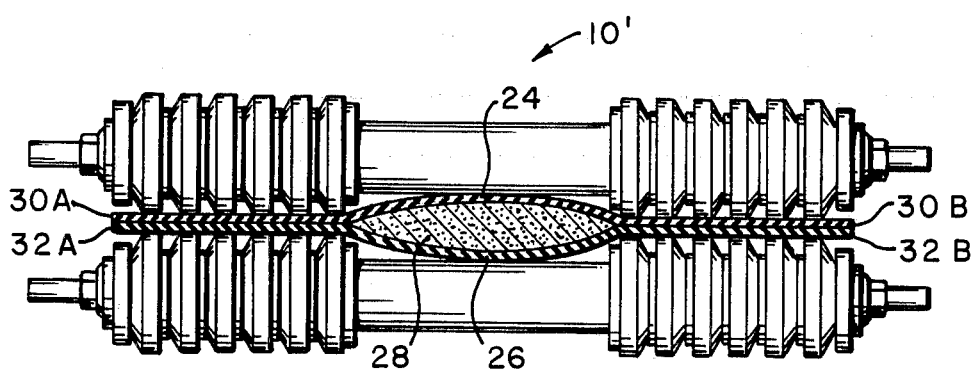
FIG. 3 is a front elevation view showing two rollers from FIG. 1 sandwiching a pair of conveyor belts having conveyed material therein.

As discussed earlier, the roller of the present invention is particularly suitable for use in conjunction with a dual or sandwich conveyor belt system. Referring now to FIG. 3, two rollers 10', each being identical to the roller 10 in FIG. 1 are shown in an abutting relationship having a pair of conveyor belts 24 and 26 (shown in cross section) therebetween. A sludge or similar material 28 is shown sandwiched between the belts 24 and 26. Note that material 28 may be any type of granular, powdered or slurry material including wood chips, pulp, sand, gravel, sewage, etc. Accordingly, the self-tracking rollers of the present invention are aptly suited for use in the paper making, water treatment, food processing and other industries. In fact, the present invention can be used in almost any materials processing application.

As is illustrated in FIG. 3, the novel construction of the rollers 10' permits a tight closure between the two belt edges 30A,32A and 30B,32B while allowing space for the sludge or similar material 28 to be sandwiched therebetween and passed along therethrough. As mentioned, the configuration and positioning of the idler and spacer rings 12 and 14 provide a unique self-tracking feature for each belt 24 and 26 on the respective rollers 10'. Also as mentioned earlier, the use of wider or narrower spacer rings 14 and idler rings 12, as well as the number of rings utilized, will result in variability of tracking correction forces. In a preferred embodiment, the space portion B of rollers 10' are about ⅓ the total roller length in order to effect the conveyance of the sandwiched material 28. Of course, this proportional dimensioning of space portion B will depend on various factors including conveyor belt size, material 28 to be conveyed, etc. Preferably, the roller length will correspond to the belt width and is typically, but not limited to, between 20 and 60 inches.

The use of self-tracking rollers 10' comprised of alternating tracking and spacer rings having a central space portion therebetween has heretofore not been found in the prior art. This absence is particularly undesirable in the sandwich belt art wherein the present invention finds such wide applicability. Accordingly, the self-tracking rollers 10', especially when used in conjunction with dual or sandwich-type conveyor belts, is both novel and unexpected. It is believed that the unexpected nature of the present invention is due to various conventional teachings in the prior art including the fact that prior art self-guiding roller designs typically utilize "crowned face" configurations, i.e., the crowned face pulley has a greater diameter at its center than at its sides. Conversely, the roller design of the present invention has a greater diameter at the sides thereof than at the center.

Referring now to FIG. 4, a typical S-shape dual or sandwich type conveyor belt incorporating the novel self-tracking rollers of the present invention is shown generally at 34. It will be understood that while an S configuration is shown in FIG. 4, the novel rollers of the present invention may be used with a dual belt system having any appropriate configuration including vertical to horizontal turns.

Sandwich belt 34 includes a materials receiving portion 36, two "roller turn" sections 38 and 40 having a vertical straight section 42 therebetween and finally a materials discharge portion 44. It will be understood that the novel rollers of the present invention permit any desired turn angle to be utlized. In this particular embodiment, the roller turn sections 38, 40 are each 90 degrees. The actual belt mechanism is comprised of two endless conveyor belts 46 and 48, a plurality of novel rollers 10'' and a plurality of more conventional self-tracking rollers 50 which have no center space portion B therein. If desired, a housing or shell (not shown) may be provided as a protective sheath surrounding the endless belts 46,48. Also, a pair of conventional pulleys 52A and B, 54A and B are associated with each respective endless belt 46 and 48.

During actual operation of the belt assembly 34, sludge or similar material 28' is deposited on lower belt 46 in the receiving portion 36. Lower belt 46 then conveys the material 28' until it contacts the upper endless belt 48 at pulley 59A whereby the space portion B of each roller 10' permits the material to be tightly sandwiched therebetween as shown in FIG. 3. Meanwhile, as discussed earlier, the novel self-tracking rollers 10' will tightly grip the conveyor belt edges 30A,32A and 30B,32B respectively together (also shown in FIG. 3). The material 28' sandwich between belts 46 and 48 then travels from the horizontal to vertical around the first roller turn section 38 into the vertical straight section 42 and finally around the second roller turn 40 into the discharge portion 44. At this point, the two belts 46 and 48 separate by the action of pulley 52B. Thus, upper belt 48 is sent back down toward the receiving portion 36 via pulley 54B and pulley 56. The separated lower belt 46 carrying the material 28' thereon will then discharge the material to another belt or to a container, reactor, etc. Preferably, scraper mechanisms (not shown) are positioned at each pulley 52B and 54B in order to remove any material still sticking to either belt 46 and 48. Finally, the lower belt 46 is sent back downwardly around pulleyss 52B and 58 toward receiving portion 36.

It will be understood that the novel self-tracking roller 10" having the central space therebetween need only be utilized when the two endless belts 46,48 are in an abutting relationship (i.e., during the roller turns and vertical section 38,40 and 42) so that the material may be conveyed therein as heretofore discussed. Otherwise, self-tracking rollers having idler and spacer rings symmetrically located across the roller will suffice to transport each individual (i.e., separated) conveyor belt.

It will also be understood that, unlike FIG. 3, the rollers 10" need not and indeed, should not be in an abutting relationship, but are preferably staggered as shown in vertical section 42 of FIG. 4. This staggering or zig-zag arrangement provides the requisite tension on the dual belts 46 and 48 which secures the material 28' therebetween and also allows flexibility in the space B of the rollers 10" so that large or oversized chuncks of material can be easily conveyed without jamming the belts.

Accordingly, the self-tracking impact absorbing belt roller of the present invention provides improved design flexibility and versatility in materials handling capability. Moreover, this improved capability is provided at very low manufacturing, assembly and maintenance costs.

Also, as mentioned, the sandwich belt rollers of the present invention allow the dual belts to convey much softer materials therebetween than prior art dual belts. Thus, for example, the present invention is capable of transporting sludges having as little as 12% solids therein.

While preferred embodiment have been shown and described, various modifications and substitutions may be made thereto without departing from the spirit and scope of the invention. Accordingly, it is to be understood that the present invention has been described by way of illustrations and not limitation.

What is claimed is:

1. In a dual or sandwich conveyer belt and roller system having a pair of superimposed conveyer belts for conveying solid material therein, the improvement comprising a self-tracking belt roller including:
   a rotatable shaft means;
   a plurality of alternating tracking rings and spacer rings arranged in a first group and a second group on said shaft means; and
   a space portion centrally located between said first and second groups;
   wherein said space portion permits a pair of dual belts to form a sandwich for conveying solid material therein; and
   wherein said groups of alternating tracking and spacer rings urge the pair of dual belts towards the center of the self-tracking belt roller and also provide a constant center directed force on the edges of the dual belts to urge the solid material into said space portion.

2. The roller of claim 1 wherein:
   said spacer rings have a cylindrical shape with a central opening therethrough, said opening being capable of receiving said shaft means.

3. The roller of claim 1 wherein:
   said tracking rings have a conical shape with a central opening therethrough, said opening being capable of receiving said shaft means, said conical tracking ring having a sloping outer surface terminating in a nose end.

4. The roller of claim 3 wherein:
   said nose end of each tracking ring points outwardly away from said central space portion.

5. The roller of claim 1 wherein:
   said space portion is equal to about ⅓ of the total roller length.

6. The roller of claim 1 wherein:
   said total roller length is about 20–60 inches.

7. The roller of claim 1 including:
   collar means on said shaft means to secure each group of tracking and spacer rings together.

8. The roller of claim 1 including:
   bearing means being provided to each end of said shaft means thereby imparting rotational movement to said shaft means.

9. The roller of claim 1 wherein:
   said tracking and spacer rings are comprised of rubber.

10. A self-tracking belt and roller system comprising:
    rotable shaft means;
    a plurality of first and second self-tracking rollers on said shaft means, each roller having a plurality of alternating tracking rings and spacer rings arranged in a first group and a second group on said shaft means and a space portion centrally located between said first and second groups; and
    a pair of endless conveyer belts sandwiched between said first and second rollers, said belts being securely gripped by said first and second groups of tracking rings;
    wherein said space portion permits a pair of dual belts to form a sandwich for conveying solid material therein; and
    wherein said groups of alternating tracking and spacer rings urge the pair of dual belts towards the center of the self-tracking belt roller and also provide a constant center directed force on the edges of the dual belts to urge the solid material into said space portion.

11. The roller of claim 10 wherein:
    said spacer rings have a cylindrical shape with a central opening therethrough, said opening capable of receiving said shaft means.

12. The roller of claim 10 wherein:

said tracking rings have a conical shape with a central opening therethrough, said opening capable of receiving said shaft means, said conical tracking ring having a smaller outer diameter at a first end, said first end defining a nose end.

13. The roller of claim 12 wherein:
said nose end of each tracking ring points outwardly away from said central space portion.

14. The roller of claim 10 wherein:
said space portion is equal to about $\frac{1}{3}$ of the total roller length.

15. The roller of claim 7 wherein:
said total roller length is about 20–60 inches.

16. The roller of claim 10 including:
collar means on said shaft means to secure each group of tracking and spacer rings together.

17. The roller of claim 10 including:
bearing means being provided to each end of said shaft means thereby imparting rotational movement to said shaft means.

18. The roller of claim 10 wherein:
said tracking and spacer rings are comprised of rubber.

19. The roller of claim 10 wherein:
said self-tracking rollers are staggered relative to one another.

20. The roller of claim 10 including:
receiving portion means capable of having material deposited therein; and
discharge portion means capable of removing material therefrom.

21. The roller of claim 19 including:
at least one turn portion means.

22. The roller of claim 20 wherein:
said turn portion means is a 90-degree turn portion.

23. The roller of claim 19 including:
at least one straight portion means.

24. The roller of claim 22 wherein:
said straight portion means is a vertical straight portion.

* * * * *